United States Patent
Stultz et al.

(10) Patent No.: US 7,620,068 B2
(45) Date of Patent: Nov. 17, 2009

(54) ADAPTIVE BANDWIDTH UTILIZATION FOR TELEMETERED DATA

(75) Inventors: Robert D. Stultz, Melbourne, FL (US); Bradford L. Kizzort, Melbourne, FL (US); Robert J. Knazik, Cocoa Beach, FL (US)

(73) Assignee: Harris Corporation, Melbourne, FL (US)

( * ) Notice: Subject to any disclaimer, the term of this patent is extended or adjusted under 35 U.S.C. 154(b) by 599 days.

(21) Appl. No.: 10/983,482

(22) Filed: Nov. 8, 2004

(65) Prior Publication Data

US 2006/0098689 A1     May 11, 2006

(51) Int. Cl.
*H04J 3/16*     (2006.01)
*H04J 3/02*     (2006.01)

(52) U.S. Cl. ....................... 370/468; 370/537
(58) Field of Classification Search ........................ None
See application file for complete search history.

(56) References Cited

U.S. PATENT DOCUMENTS

| | | | | |
|---|---|---|---|---|
| 3,700,820 A * | 10/1972 | Blasbalg et al. | ............. | 370/468 |
| 5,627,970 A | 5/1997 | Keshav | | |
| 5,949,758 A | 9/1999 | Kober | | |
| 6,212,201 B1 * | 4/2001 | Hinderks et al. | ............. | 370/468 |
| 6,229,799 B1 * | 5/2001 | Caillerie et al. | ............. | 370/347 |
| 6,343,085 B1 | 1/2002 | Krishnan et al. | | |
| 6,404,776 B1 | 6/2002 | Voois et al. | | |
| 6,490,249 B1 | 12/2002 | Aboul-Magd et al. | | |
| 6,563,517 B1 * | 5/2003 | Bhagwat et al. | ............. | 715/735 |
| 6,618,385 B1 | 9/2003 | Cousins | | |
| 2007/0201563 A1 * | 8/2007 | Yamaguchi et al. | .... | 375/240.26 |

OTHER PUBLICATIONS

U.S. Appl. No. 10/445,540, filed May 27, 2003, Stultz.
U.S. Appl. No. 10/948,035, filed Sep. 23, 2004, Stultz.

* cited by examiner

*Primary Examiner*—Ricky Ngo
*Assistant Examiner*—Clemence Han
(74) *Attorney, Agent, or Firm*—Darby & Darby PC; Robert J. Sacco

(57) ABSTRACT

A method and a system for optimizing bandwidth utilization in a communications network (100) in which a commutated bitstream (115) is transmitted. The present invention can include a commutation format definition generator (405) which processes at least one triage value (425) to automatically generate commutation format definitions (155). The triage values can represent priority levels of data elements (420) in particular system states (430) and can be used to determine data transmission rates applicable to the data elements. The system can include a data source (105) which can process the commutation format definitions to generate the commutated bitstream. The data source can select a new commutation format definition to change the format of the commutated bitstream when the system state of the data source changes and optimize the commutated bitstream for the current system state and the current available network bandwidth.

23 Claims, 7 Drawing Sheets

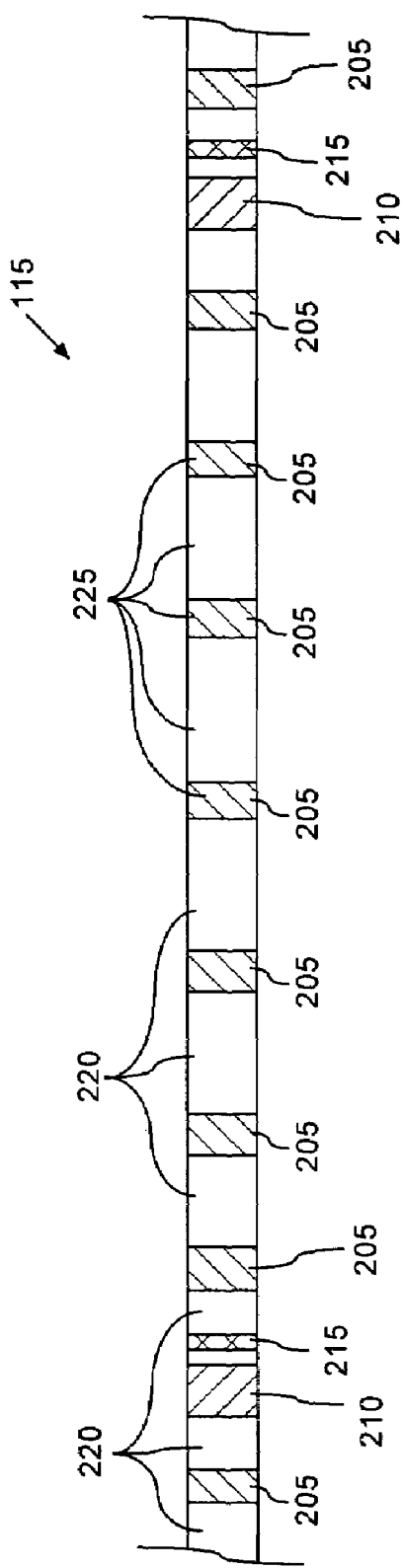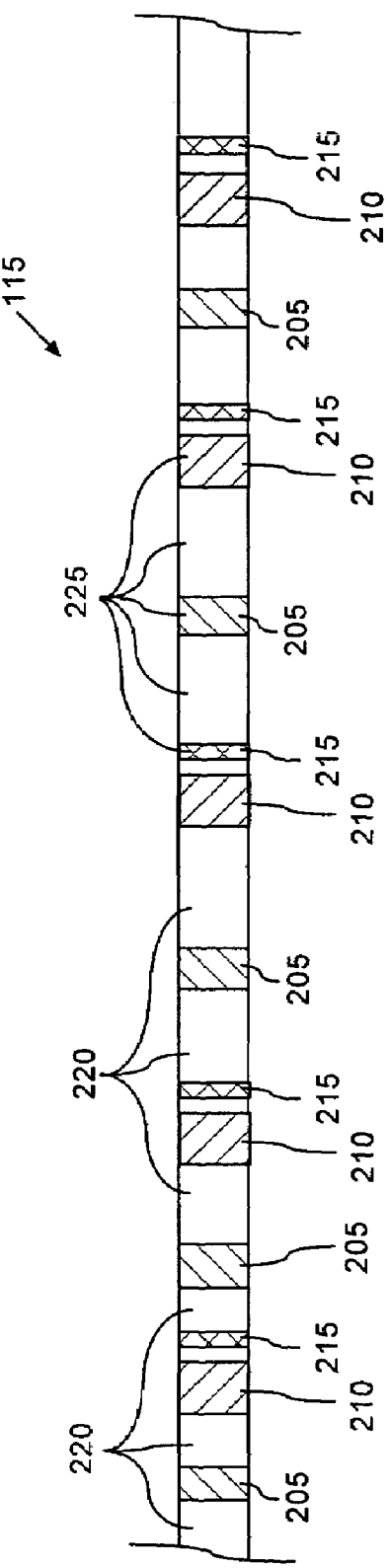

ADAPTIVE BANDWIDTH UTILIZATION FOR TELEMETERED DATA

BACKGROUND OF THE INVENTION

1. Statement of the Technical Field

The inventive arrangements relate to the field of data propagation, and more particularly, to formatting a communications bitstream.

2. Description of the Related Art

In a typical communications system, the priority status assigned for transmission of different data types within a bitstream is pre-determined and does not change. However, the importance of the data may indeed change. For example, in a tactical command and control system, the importance of certain types of data may vary based on a type of mission being executed. For instance, battery voltage information may have low importance during nominal operation of a particular system, but access to such information may become very important if a hardware fault occurs. Similarly, status information of a weapons system may have low to moderate importance during a search mission, but the weapons status information will be critically important during combat operations.

Methods have been developed to improve network communications, but such methods do not automatically reprioritize data transfer when the importance of data being propagated changes. For example, U.S. Pat. No. 6,563,517 to Bhagwat et al. (hereinafter "Bhagwat") concerns methods, devices and systems for dynamically adjusting transcoding parameters so as to increase the benefits of transcoding. The methods of adaptation are designed to cope with the variability of network characteristics and of the size of transcoded images, but such methods do not address changing data priorities; to the contrary, a user pre-defines data priorities. Accordingly, if data were to suddenly become important due to a change in operational circumstances, the data would not be reprioritized without some level of user interaction.

SUMMARY OF THE INVENTION

The present invention relates to a method and a system for optimizing bandwidth utilization in a communications network in which a commutated bitstream is transmitted. The present invention can include a commutation format definition generator which processes at least one triage value to automatically generate commutation format definitions. The triage values can represent priority levels of data elements in particular system states and can be used to determine data transmission rates applicable to the data elements.

Each commutation format definition that is generated can be assigned to a particular system state and define the commutation format for a commutated bitstream transmitted by a data source in that system state. Additionally, a plurality of commutation format definitions can be assigned to each system state, with each commutation format definition being optimized for a specific range of available bandwidth. Accordingly, transmission of the commutated bitstream can be optimized for both the current system state and the network bandwidth that is currently available.

By way of example, the commutation format definition generator can receive a set of triage values which includes at least a first triage value assigned to a data element for a first system state and a second triage value assigned to the data element for a second system state. The commutation format definition generator can process the first triage value when generating commutation format definitions for the first system state, and process the second triage value when generating commutation format definitions for the second system state.

A data source, which includes a commutation engine, can process the commutation format definitions to generate a commutated bitstream. In particular, the commutation engine can process a first commutation format definition correlating to a first system state to generate the commutated bitstream when the data source is in the first system state. When a change in the system state is identified, for example when the system changes from the first system state to a second system state, the commutation engine can process a second commutation format definition to format the commutated bitstream. In one arrangement, the data source can receive the triage values correlating to the second system state and automatically generate the second commutation format definition to be implemented.

BRIEF DESCRIPTION OF THE DRAWINGS

FIG. 2 is a diagram illustrating a serial bitstream data format which is useful for understanding the present invention.

FIG. 3 is a diagram illustrating another serial bitstream data format which is useful for understanding the present invention.

DETAILED DESCRIPTION OF THE PREFERRED EMBODIMENTS

An embodiment in accordance with the present invention relates to a system and a method for adaptively propagating data in a commutated bitstream based on data element priority. More particularly, when a system state change occurs in a system generating data elements transmitted in the commutated bitstream, for example the system changes from a first system state to a second system state, a commutation format definition correlating to the new system state can be automatically selected for formatting the commutated bitstream. The selected commutation format definition also can define a data transmission rate that is optimized for the available bandwidth. Accordingly, data transmission can remain optimized without user interaction when the system state and/or available bandwidth changes.

A further embodiment relates to a system and a method for automatically generating the commutation format definitions. Notably, each data element to be transmitted in the commutated bitstream can be assigned a triage value for each system state. The triage values can be used to automatically generate commutation format definitions for the respective system states and data transmission rates. Thus, state specific commutation format definitions can be generated in an efficient manner requiring minimal user input.

Figure 1:
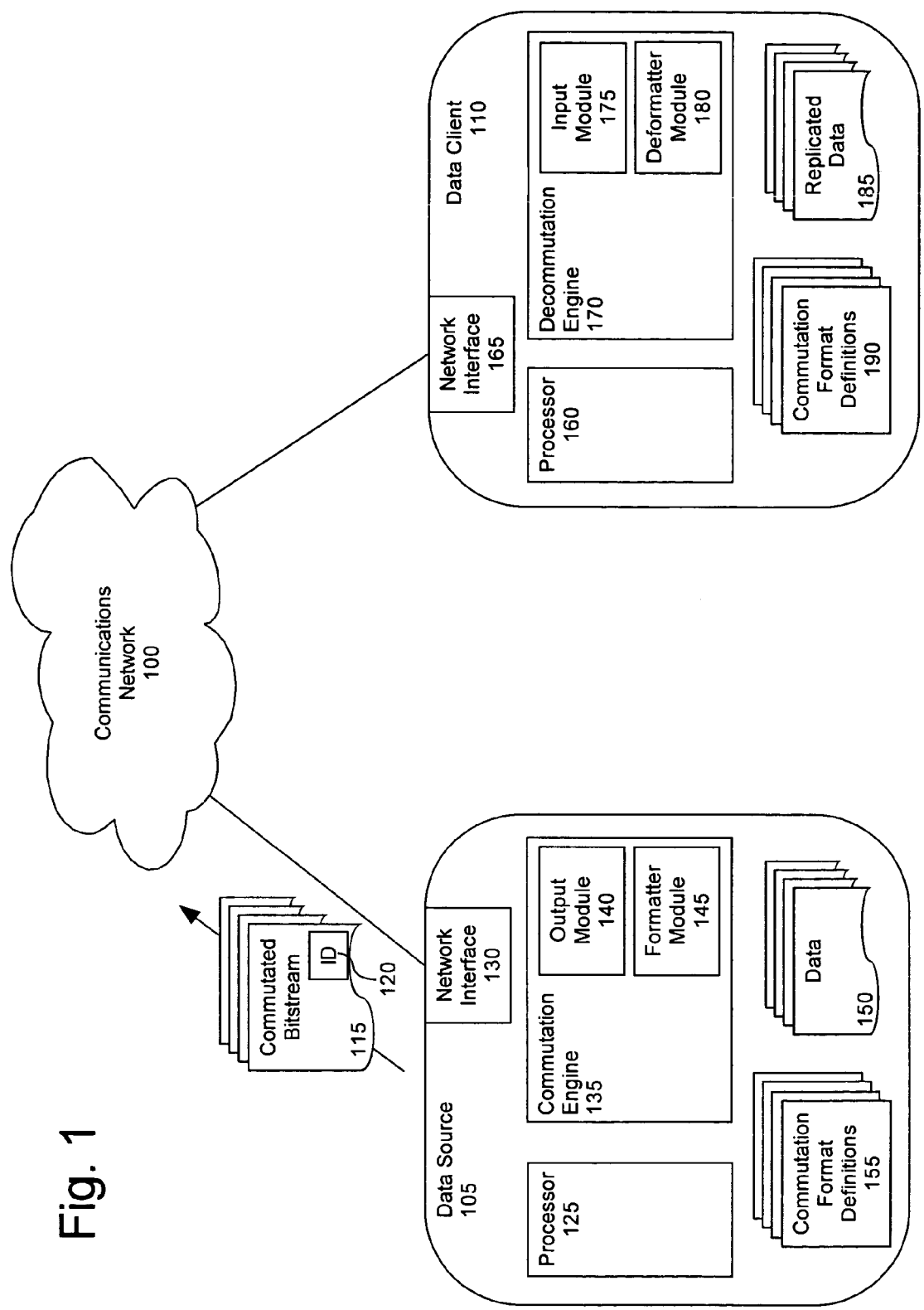
FIG. 1 is a diagram of a communications network which is useful for understanding the present invention.

An example of a communications network 100 which is useful for understanding the present invention is depicted in FIG. 1. The communications network 100 can comprise a wide area network (WAN), a local area network (LAN), a telemetry system, a public switched telephone network (PSTN), a public switched data network (PSDN), an intranet, the Internet, a mobile radio communications network, a cellular telephone communications network, and/or any other suitable communications network.

A data source 105 and a data client 110 can be communicatively connected as nodes of the communications network 100. The data source 105 can be a processing device operatively connected to the communications network 100 and which can propagate a commutated bitstream 115 to the data client 110. Similarly, the data client 110 can be a processing device operatively connected to the communications network 100 which can receive the commutated bitstream 115 from the data source 105.

The data source 105 and the data client 110 each can be computers such as servers, workstations, personal computers, portable computers, application specific processing systems, or any other devices or systems which can communicate using a commutated bitstream. Further, the data source 105 and the data client 110 each can include a respective processor 125, 160. The processors 125, 160 can be central processing units (CPUs), digital signal processors (DSPs), application specific integrated circuits (ASICs), or any other suitable processors. By way of example, the data source 105 and/or the data client 110 can be components of emergency response systems, battlefield management systems, satellite systems, security systems, transportation systems, health monitoring systems, environment monitoring systems, energy supply systems, communications systems, or any other systems in which available bandwidth may vary.

The data source 105 can include a network interface 130 for transmitting data. The network interface 130 also can receive data, although the invention is limited in this regard. The network interface 130 can be, for example, a modem or transceiver. Modems and transceivers are well known to the skilled artisan. In particular, the network interface 130 can transmit the commutated bitstream 115 via the communications network 100.

The data source 105 also can include a commutation engine 135 which generates the commutated bitstream 115. The commutation engine 135 can comprise an output module 140 and a formatter module 145. The formatter module 145 can place data 150 into the commutated bitstream 115 in accordance with commutation format definitions 155. The output module 140 can apply appropriate messaging protocols to communicate the commutated bitstream 115 over the communications network 100. Notably, the commutated bitstream 115 can be transmitted using any suitable messaging protocol. Such messaging protocols are also known to the skilled artisan.

As defined herein, a commutated bitstream is a serial stream of data containing a plurality of interspersed data elements. The commutated bitstream 115 can be organized in accordance with one or more commutation format definitions 155 which define the structure of the commutated bitstream 115. The commutation format definitions 155 can, for example, define what data elements to include in the commutated bitstream 115, define sampling rates to be used for the data elements, define the position of the data elements in the commutated bitstream 115, define how many bits are allocated for each data element, and/or define any other bitstream parameters. Further, the commutation format definitions 155 can provide conditional formatting. For instance, the commutation format definitions 155 can include Boolean logic and/or conditional statements.

The commutation format definition 155 that is used to format the commutated bitstream 115 can be selected based on the state of the data source 105 (or the state of a system to which the data 105 pertains). Further, conditions of the communications network 100 also can be evaluated when selecting the commutation format definition 155. For example, available bandwidth and data latency in the communications network 100 can be considered.

The commutation format definitions 155 can be contained in a data store contained within, or communicatively linked to, the data source 105. The data store can be, for example, an electronic storage medium, an optical storage medium, a magnetic storage medium, a magneto-optical storage medium, or any other type of storage medium which can store data. In one arrangement, the commutation format definitions 155 can be contained in data tables. However, the invention is not limited in this regard. For instance, the commutation format definitions 155 can be stored as data files, text files, or in any other suitable manner. Further, the commutation format definitions 155 can be replaced, appended or deleted, and new commutation format definitions can be added to change available commutation format options.

The data client 110 can include a network interface 165 for receiving data. The network interface 165 also can transmit data, although the present invention is not so limited. The network interface 165 can be used to receive the commutated bitstream 115. The data client 110 also can include a decommutation engine 170 which decommutates the commutated bitstream 115 to produce replicated data 185. The decommutation engine 170 can comprise an input module 175 and a deformatter module 180. The input module 175 can receive the commutated bitstream 115 and translate the commutated bitstream 115 to remove messaging protocol information.

The deformatter module 180 can parse data 150 from the commutated bitstream 115 in accordance with commutation format definitions 190. The commutation format definitions 190 can correlate to the commutation format definitions 155. For example, the commutation format definitions 190 can be similar or identical to the commutation format definitions 155. Again, the commutation format definitions 190 can be contained in a data store.

In one arrangement, the deformatter module 180 can analyze the commutated bitstream 115 to select an appropriate commutation format definition 190. For example, the deformatter module 180 can parse one or more identifiers 120 from the commutated bitstream 115. The identifier 120 can be contained in packet (or frame) headers, trailers, or any other suitable locations within the commutated bitstream 115.

The identifier 120 can be any identifier which indicates to the data client 110 which commutation format definition 190 to select for decommutating the commutated bitstream 115. For example, the identifier 120 can be a commutation format identifier that indicates which commutation format definition 155 was used to commutate the commutated bitstream 115. In another arrangement, the identifier 120 can be a state indicator which indicates the current state of the data source 105 (or a system to which the data 150 pertains) and/or the conditions of the communications network 100. The identifier 120 can be sent at periodic intervals, each time the data source 105 (or a system to which the data 105 pertains) changes state, and/or each time the commutation format of the commutated bitstream 115 changes.

Data elements which are transmitted in the commutated bitstream 115 can be prioritized so that certain data elements are allocated a minimum number of time slots for a given period of time in each respective commutation format. Thus, certain data elements can be given priority over other data elements. More particularly, if data element priorities change due to a system state change in the data source 105 (or other system), for example the data source 105 changes from a first system state to a second system state, a commutation format definition 155 correlating to the new system state can be automatically selected. Accordingly, transmission of the data elements can be optimally prioritized for the new system state without user interaction.

Other details of the commutation and decommutation engines and associated modules and functions are disclosed in commonly assigned U.S. Pat. Nos. 6,048,366 and 6,256, 602, commonly assigned U.S. patent application Ser. No. 10/445,640 filed May 27, 2003, and commonly assigned International Patent Application No. WO 01/55874, the disclosures of which are hereby incorporated by reference in their entirety. In the case of conflict the present specification, including definitions, will control.

Referring to FIG. 2, a diagram is shown which illustrates an example of the commutated bitstream 115 formatted with a first commutation format definition optimized for a given system state and data transmission rate. As shown, the commutated bitstream 115 contains a plurality of data elements which are transmitted in time slots 225. For example, the commutated bitstream 115 can contain a first data element 205, a second data element 210, a third data element 215, and other data elements 220. In this example, the first data element 205 has been given a high priority status, while the second and third data elements 210, 215 have not.

Referring to FIG. 3, a diagram is shown of an example of the commutated bitstream 115 formatted in accordance with a second commutation format definition. The second commutation format definition can be selected if the system state of the data source 105 changes. Such a state change may cause the importance of the data elements 205, 210, 215 and/or 220 to change. For instance, in the present example the second and third data elements 210, 215 have been given a high priority status, while the priority of the first data element 205 has been reduced. Accordingly, the sampling rate of the second and third data elements 210, 215 has increased while the sampling rate of the first data element 205 has decreased. The sampling rate of other data elements 220 can be adjusted to fill times slots 225 which are not used by the first, second or third data elements 205, 210, 215.

In this example, two data elements were assigned high priority status, but the invention is not limited in this regard. Importantly, multiple priority levels can be established and any number of data elements—or none at all—can be assigned to each priority level. The number of time slots allocated to each data element can be determined based on the transmission baud rate and the number of data elements assigned to each priority level.

Figure 4:
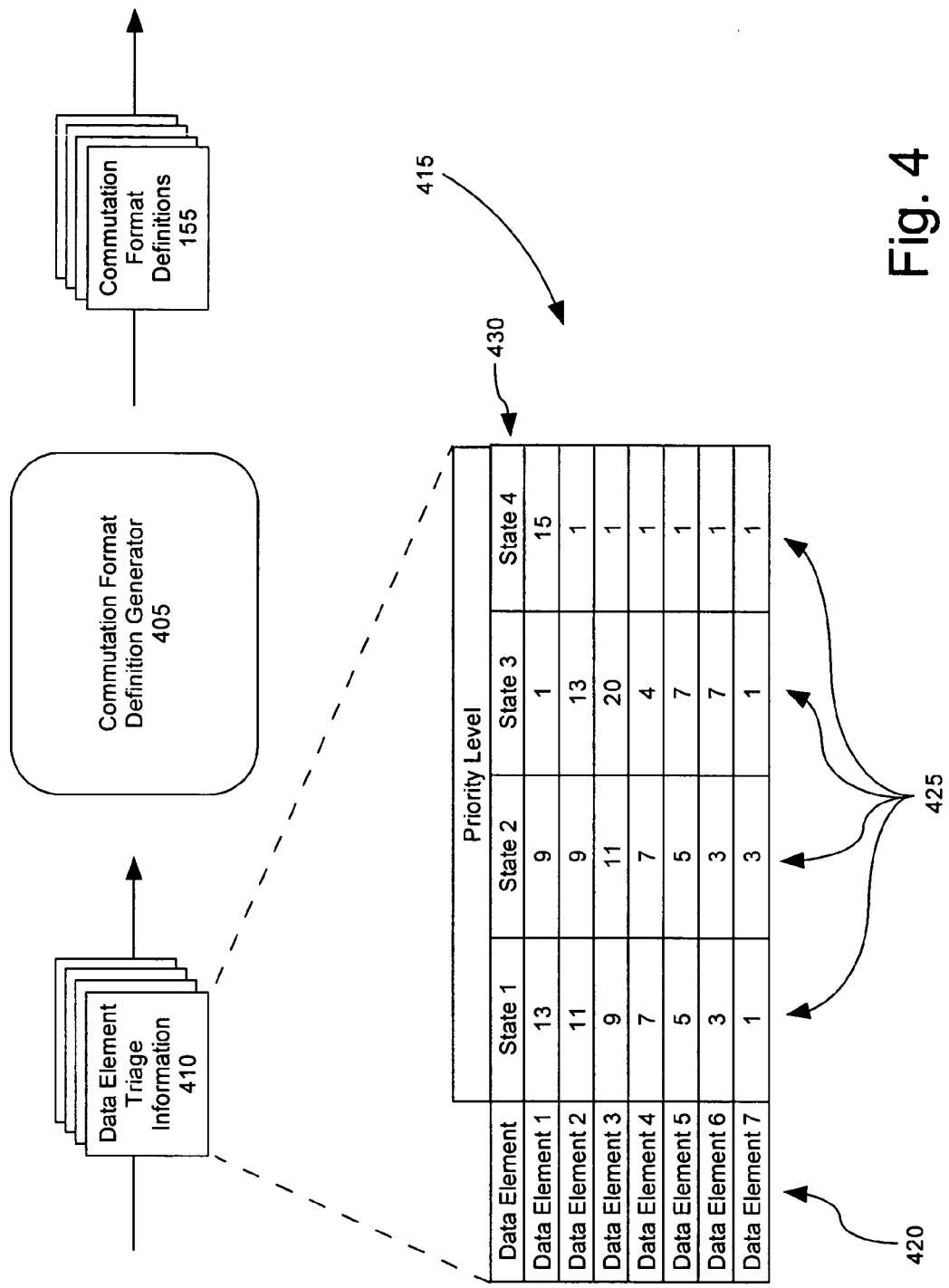
FIG. 4 is flow diagram depicting generation of commutation format definitions from data element triage values.

FIG. 4 is diagram depicting generation of commutation format definitions 155 from data element triage information 410 using a commutation format definition generator 405. The commutation format definition generator 405 can be contained in the data source, the data client, or in any other suitable system in the communications network. Further, the commutation format definition generator 405 can be implemented as hardware, software, or a combination of hardware and software. For example, the commutation format definition generator can be implemented as a processor executing suitable program code.

The data element triage information 410 can be contained in data tables, such as table 415. However, the invention is not limited in this regard. For instance, the data element triage information 410 can be stored as data files, text files, or in any other suitable manner. Advantageously, the data element triage information 410 can be updated, appended or deleted at any time by users having appropriate permissions. Moreover, commutation format definitions can be automatically re-generated when such changes to the triage information 410 are implemented. Accordingly, data transmitted in the commutated bitstream can reflect current informational requirements.

The data table 415 can comprise a data element identifier 420 which identifies a data element which is to be transmitted in the commutated bitstream. The data table 415 also can comprise one or more triage values 425 which are assigned to each data element identifier 420. Each triage value 425 can indicate the priority of a correlating data element 420 for a particular system state 430. Each system state 430 can correlate to a possible system state of a system with which the data elements are associated. For example, the data elements 420 can represent telemetry from an autonomous vehicle and the system states 430 can represent system states of the autonomous vehicle.

The data table 415 can be presented to a user in any suitable manner, for example in a graphical user interface (GUI). In such an arrangement, the data table 415 can be configured to allow the user to sort data based on different criteria, thus enabling the user to quickly see where the important data resides. For instance, the user can be presented with selectable options for representing each of the triage values 425 in a particular manner. More specifically, the user can be presented with selectable options for representing the triage values 425 with numbers, labels, hues, or in any other manner which indicates a level of priority.

For example, the user can select to view each triage value 425 as a number which indicates a high level of priority for a data element 420, or as a label—such as low, medium, high, critical, etc. —which indicates such level of priority. In an arrangement in which the triage values 425 are assigned numbers, labels can be displayed to indicate in which numerical ranges the triage values are assigned. For instance, triage values which are assigned numbers in the range from 0 to 4 can be identified as "low," triage values which are assigned numbers in the range from 5 to 9 can be identified as "medium," and so on.

In another arrangement, the triage values 425 can be color coded to indicate, at a glance, a degree of criticality of a data element. Notably, any desired color schemes can be used. For example, a dark color, such as dark blue, could be used to indicate a triage value 425 which is associated with a data element having a very low priority. Similarly, a bright color, such as bright red, could be used to indicate a triage value 425 which is associated with a data element having a very high priority.

In yet another arrangement, a direct correlation can be defined between numbers which are used to indicate priority levels and the color hues that are presented. For example, a sliding color scale can be presented to the user in the GUI when the user selects a particular system state 430 for a particular data element 420. The user can use the sliding color scale to select a priority level for a data element 420 by selecting a particular color hue. A number which correlates to the selected color hue then can be assigned as the triage value 425 for the data element 420 in the selected system state 430.

Each data element 420 also can have an associated maximum report rate (not shown). The maximum report rate can be a maximum desired rate at which a data element should be transmitted in the commutated bitstream assuming maximum available bandwidth. For instance, the maximum report rate can be expressed as a number of data element reports per period.

Figure 5:
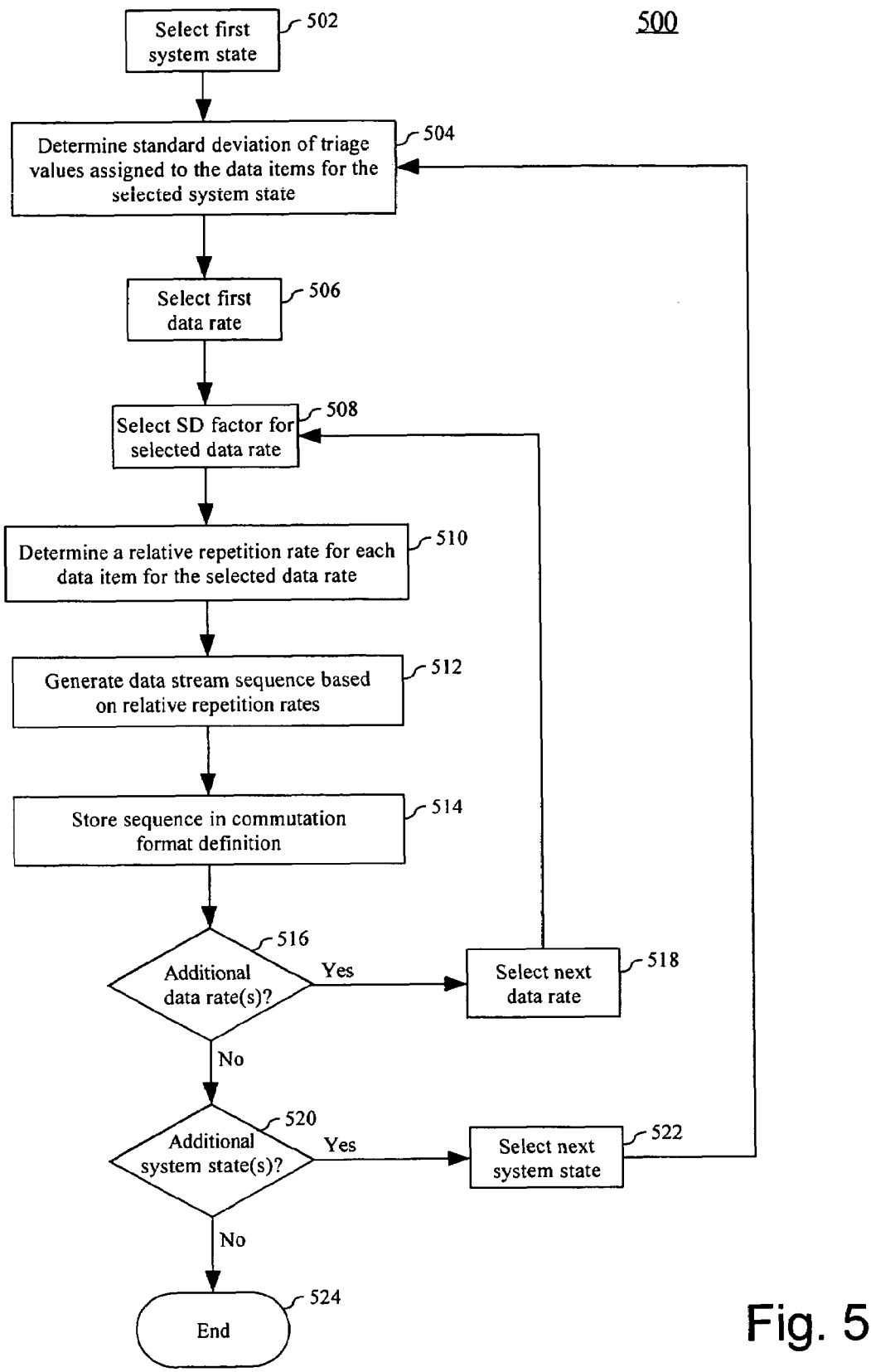
FIG. 5 is a flowchart that is useful for understanding a method of generating commutation format definitions from data element triage values.

A flowchart is shown in FIG. 5 that presents an example of a method 500 that can be used to process the triage values for generating a commutation format definition. The commutation format definition can allocate the data elements to specific locations in the commutated bitstream based on data element priority. Notably, commutation format definitions can be created independently for each specific system state and data transmission rate. In the example method 500, the triage values can be processed to determine a relative repetition rate for each data element to be transmitted in the commutated bitstream. A data stream sequence then can be generated based on these relative repetition rates and stored in a commutation format definition. Importantly, other methods can be used to generate the commutation format definition, and the invention is not limited to the specific embodiment disclosed herein.

The method 500 can begin at step 502 wherein a first system state is selected from the data table. The standard deviation of the triage values assigned to the data elements for the first system state then can be determined, as shown in step 504. For example, given the triage values 425 for state 1 in the table 415 of FIG. 4, the standard deviation can be calculated to be 4.32.

Referring to step 506, a first data rate can be selected. The first data rate can, for example, be a maximum transmission rate of the commutated bitstream, a minimum transmission rate, a nominal transmission rate, or any other desired transmission rate. At step 508, a standard deviation factor SF can be selected for the selected data rate. The standard deviation factor can be selected from a look-up table or calculated using an equation that includes the selected data rate as a parameter. The standard deviation factor can be used to adjust the range of repetition rates applicable to the range of data elements. In particular, a standard deviation factor which is greater than 1 will proportionally increase the repetition rate of data elements having higher triage values relative to data elements having lower triage values. Accordingly, a standard deviation factor greater than 1 is advantageous to insure high priority data elements are transmitted at a sufficiently high repetition rate when the available bandwidth is low. Similarly, a standard deviation factor which is less than 1 will proportionally increase the repetition rates of data elements having lower triage values relative to the repetition rates of data elements having higher triage values. Accordingly, a standard deviation factor less than 1 can be used to provide a greater resolution of low priority data without adversely affecting the repetition rates of high priority data, when sufficient bandwidth is available to do so.

For illustration purposes, the standard deviation factor for the first system state is selected to be 1. Proceeding to step 510, a relative repetition rate for each data element can be determined for the selected data rate. For example, for each triage value $TV_n$ a standard deviation quotient $SDQ_n$ can be determined using the following equation:

$$SDQ_n = TV_n * SF/SD \qquad (1)$$

where SD is the standard deviation of the triage values assigned to the selected system state. For the triage values 425 for state 1 in table 415, the standard deviation quotients SDQ are 3.01, 2.55, 2.08, 1.62, 1.16, 0.69, 0.23 for data elements 1 through 7, respectively. The standard deviation quotients then can be normalized to integer values to generate the relative transmission frequencies. Normalization of the standard deviation quotients can be accomplished in any suitable manner. For example, in one arrangement the relative repetition rate R can be determined by the following equation:

$$R_n = \text{ROUND}(SDQ_n + (1 - SDQ_{min})) \qquad (2)$$

where $SDQ_{min}$ is the lowest standard deviation quotient from the range, which is 0.23 in the present example. Thus, for state 1 in table 415, the relative repetition rates would be 4, 3, 3, 2, 2, 1, 1 for data elements 1 through 7, respectively.

Continuing to step 512, the data stream sequence then can be generated based on the relative repetition rates and stored in a commutation format definition. The relative repetition rates can be processed in any suitable manner to generate the data stream sequence. One such method is presented in FIG. 6 and discussed below. An example of a data stream sequence generated with the above relative repetition rates could be:

{1,2,3,4} {1,2,3,5} {1,2,3,4} {1,5,6,7} in which "1" represents data element 1, "2" represents data element 2, and so on. In this example four data elements are transmitted in each frame.

At step 514 the data stream sequence can be stored in a commutation format definition. An identifier can be provided with the commutation format definition to correlate the commutation format definition to the system state and data rate to which the data stream sequence correlates.

Proceeding to decision box 516 and step 518, a next data rate can be selected to generate additional commutation format definitions for the selected system state. The implementation of additional commutation format definitions can insure optimal data transmission for variety of data transmission rates, which is advantageous when a data source will be operating in an environment where the bandwidth is limited and dynamically changing. More particularly, the additional commutation format definitions can be optimized to consistently transmit high priority data elements with sufficient repetition. This can be accomplished by selecting the standard deviation factor to be greater than 1 when the available bandwidth is low, and selecting the standard deviation factor to be less than 1 when there is sufficient bandwidth available.

Proceeding again to step 508, a standard deviation factor, for example 2, can be selected for the second data rate. Proceeding again to step 510, equations (1) and (2) can be applied to the triage values 425 for state 1 using a standard deviation factor of 2. The resulting repetition rates are 7, 6, 5, 4, 3, 2, 1, respectively. An example of a data stream sequence for such repetition rates would be:

{1,2,3,4} {1,2,3,4} {1,2,3,5} {1,2,3,4} {1,2,5,6} {1,2,3,4} {1,5,6,7}

On the other hand, applying equations (1) and (2) to the same triage values using a standard deviation factor of 0.5 will provide relative repetition rates of 2, 2, 2, 2, 1, 1, 1, respectively. An example of a data stream sequence for such repetition rates could be:

{1,2,3,4} {1,2,3,4} {1,5,6,7}

The process can continue until a commutation format definition has been generated for the first system state at each data rate. The method then can continue to decision box 520 and step 522 wherein a next system state is selected and the process can repeat. The process can end at step 524 after commutation format definitions have been generated for each system state at each repetition rate.

Figure 6:
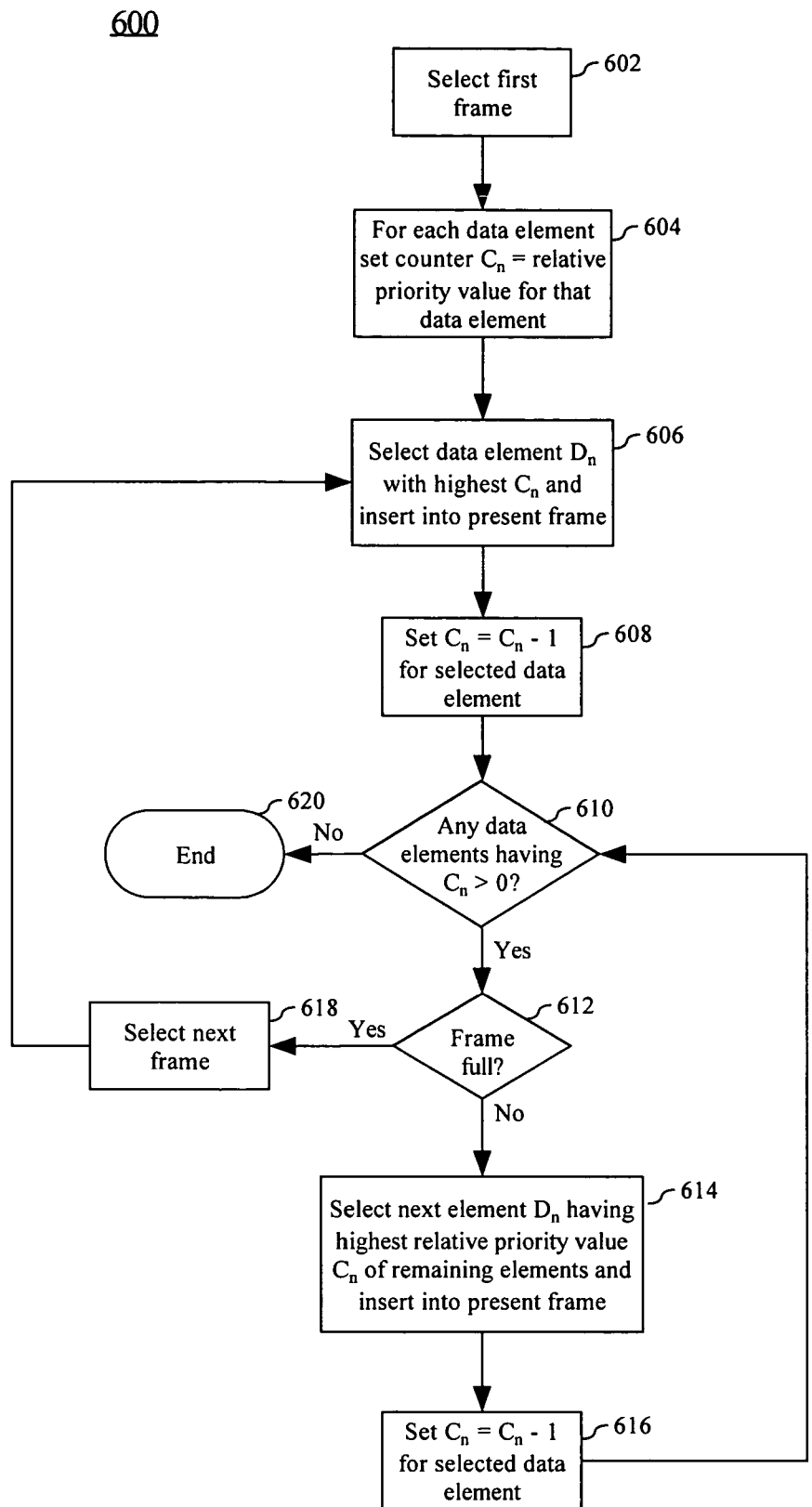
FIG. 6 is a flowchart that is useful for understanding a method of generating a data stream sequence from relative repetition rates.

FIG. 6 presents a method 600 which can be used to generate a data stream sequence from the relative repetition rates. Beginning at step 602 a first frame can be selected. At step 604 a counter $C_n$ for each data element can be set to the relative priority value determined for that data element. Proceeding to step 606, a data element with the highest value $C_n$ can be selected and inserted into the present frame. Continuing to step 608, $C_n$ for that data element can be decremented by 1. Referring to decision boxes 610 and 612, if there are additional data elements having $C_n>0$ and the present frame is not full, then the next data element $D_n$ of the remaining data elements (not including the data element just placed into the present frame) having the highest value of $C_n$ can be selected and inserted into the present frame, as shown in step 614. $C_n$ for data element $D_n$ then can be decremented by 1, as shown in step 616.

Referring again to decision box 612, if the present frame is full, then at step 618 the next frame can be selected. Referring again to step 606, the data element $D_n$ (selected from all of the data elements) having the highest value of $C_n$ can be selected into the present frame and the process can continue until there are no data elements left having $C_n>0$. When this occurs, the process can end as shown in decision box 610 and step 620. In one arrangement, if the last frame is not full, data elements having the highest relative repetition rates can be selected and inserted into the last frame until the frame is full.

At this point it should be noted that the commutation format definitions can be automatically generated prior to, during, or after activation of a system which uses the commutation format definitions. For example, the system can be updated with new commutation format definitions at anytime. Indeed, in one arrangement the triage values can be stored in the system and the system can automatically generate an appropriate commutation format definition when such a definition is needed. For example, a new commutation format definition can be generated in accordance with steps 508 through 514 of FIG. 5 each time the system changes state or the available bandwidth changes. In particular, the system can select a standard deviation factor correlating to the available bandwidth and selected triage values correlating to the current system state to generate a new commutation format definition each time the system state changes or the available bandwidth changes by a prescribed amount.

Figure 7:
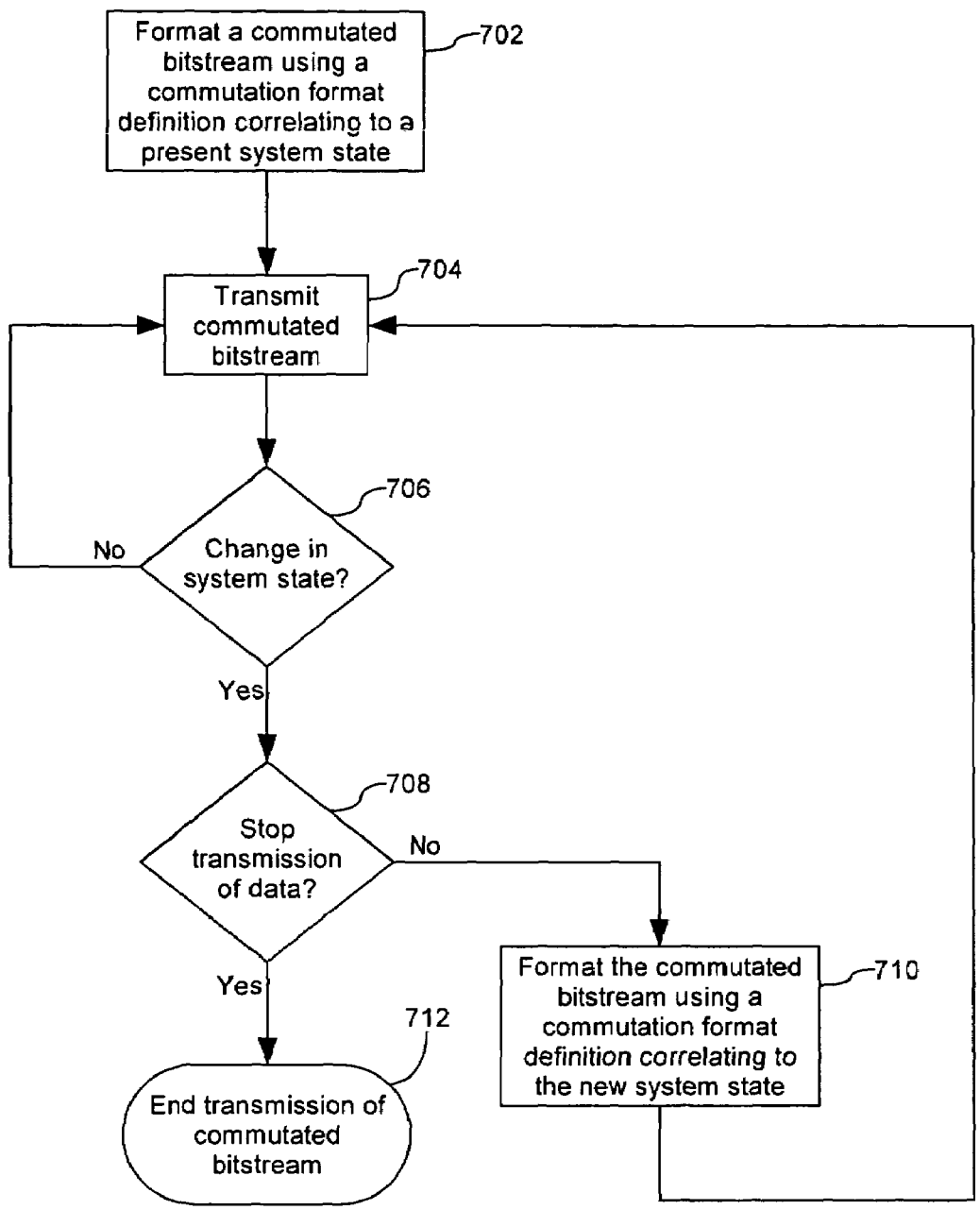
FIG. 7 is a flowchart that is useful for understanding a method of formatting a commutated bitstream with a new commutation format when a change in a system state occurs.

FIG. 7 presents a method 700 of formatting a commutated bitstream with a new commutation format when a change in a system state occurs. The system states can be user defined and/or determined by one or more algorithms which process system data. For example, for a surveillance aircraft, a first system state can be defined to be a state in which the aircraft is taxiing to a runway. A second system state can be a state in which the aircraft is taking off, a third system state can be a state in which the aircraft is proceeding to its target, and a fourth system state can be a state in which the aircraft has reached its target and begins surveillance. A fifth system state can be a state in which a specific type of malfunction has occurred within the aircraft. Of course, there is no limitation to the number or types of system states that can be defined.

A change in system state can be identified in any suitable manner. For example, a system state change can be identified by processing data received from sensors, processing telemetered data, or monitoring a system clock. Importantly, the invention is not limited in this regard any process suitable for identifying a system change is within the scope of the present invention.

Beginning at step 702, a commutated bitstream can be formatted using a commutation format definition correlating to a present system state and the commutated bitstream can be transmitted, as shown in step 704. Referring to decision box 706, if a change in a system state occurs, for example the surveillance aircraft reaches its target and begins surveillance, a decision can be made whether to stop transmission of data, as shown in step 708. If transmission of data is still required, then the commutated bitstream can be formatted with a commutation format definition correlating to the new operational state, as shown in step 710. Alternatively, the commutated bitstream transmission can end, as shown in step 712. Transmission of the commutated bitstream can re-commence at anytime data needs to be transmitted and the process can repeat.

Figure 8:
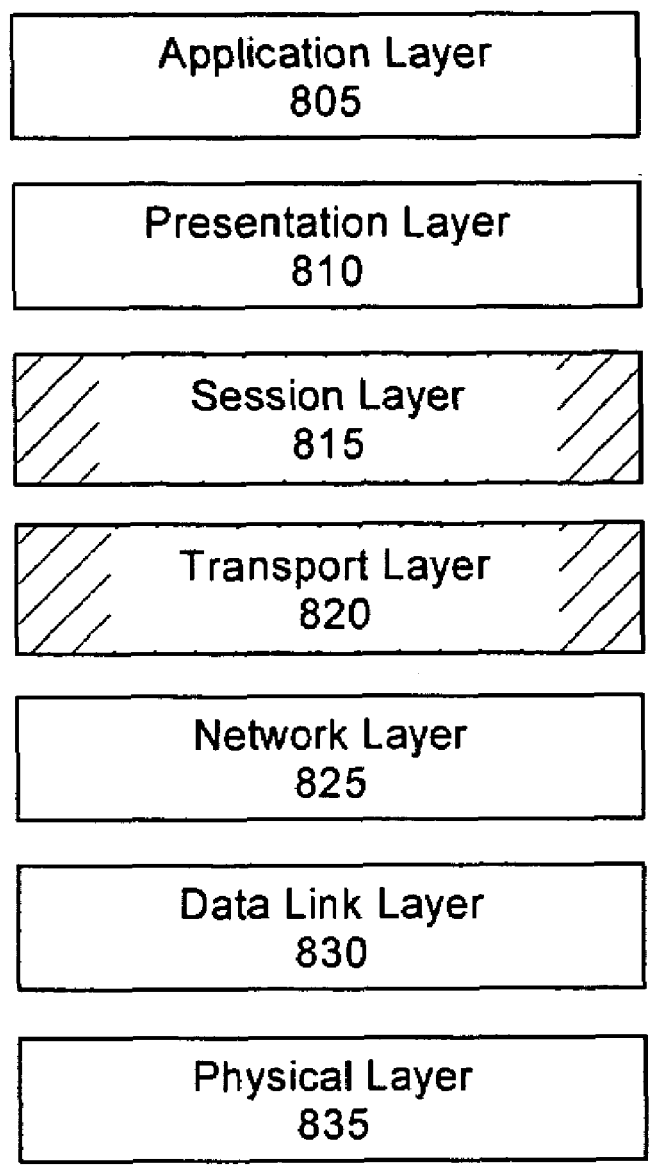
FIG. 8 is a diagram depicting layers of the open systems interconnection (OSI) standard which are useful for understanding the method of the present invention.

Referring to FIG. 8, a diagram is shown depicting the seven layers 800 of the open systems interconnection (OSI) standard which can be used to define the structure of the communications network in which the aforementioned method is implemented. The seven layers 800 can include an application layer 805, a presentation layer 810, a session layer 815, a transport layer 820, a network layer 825, a data link layer 830 and a physical layer 835. Notably, the method can be implemented in a layer that is above the network layer 825. For example, the method can be implemented in the session layer 815 and/or in the transport layer 820. Accordingly, the present invention is independent of the network protocol or network hardware that is being used, and therefore can be implemented in existing communications networks without requiring changes to the network hardware or software.

The present invention can be realized in hardware, software, or a combination of hardware and software. The present invention can be realized in a centralized fashion in one computer system, or in a distributed fashion where different elements are spread across several interconnected computer systems. Any kind of computer system or other apparatus adapted for carrying out the methods described herein is suited. A typical combination of hardware and software can be a general purpose computer system with a computer program that, when being loaded and executed, controls the computer system such that it carries out the methods described herein.

The present invention also can be embedded in a computer program product, which comprises all the features enabling the implementation of the methods described herein, and which when loaded in a computer system is able to carry out these methods. Computer program or application program in the present context means any expression, in any language, code or notation, of a set of instructions intended to cause a system having an information processing capability to perform a particular function either directly or after either or both of the following: a) conversion to another language, code or notation; b) reproduction in a different material form.

This invention can be embodied in other forms without departing from the spirit or essential attributes thereof. Accordingly, reference should be made to the following claims, rather than to the foregoing specification, as indicating the scope of the invention.

We claim:

1. A method for optimizing bandwidth utilization in a communications network, comprising:

defining a plurality of operating states of an autonomous vehicle, each associated with one of a plurality of activities performed by said autonomous vehicle in connection with a mission, said plurality of activities exclusive of data communication functions;

dynamically determining a current operating state of said autonomous vehicle based on a current activity of said autonomous vehicle;

generating data elements in a communication system onboard said autonomous vehicle, said data elements to be transmitted in a commutated bitstream;

automatically generating a commutation format definition for said data elements which defines a commutation format for said commutated bitstream, said automatically generated commutation format definition automatically selectively determined based on said current operating state of said autonomous vehicle; and formatting said commutated bitstream using said automatically generated commutation format definition;

wherein said automatically generated commutation format definition specifies a data stream sequence for transmitting all of said data elements in said commutated bitstream, said data stream sequence based on at least a relative priority level of said data elements during said current operating state.

2. The method according to claim 1, wherein said automatically generating said first commutation format definition step further comprises receiving at least one triage value specifying said relative priority level for at least one of the data elements.

3. The method according to claim 2, further comprising defining the triage value to correlate to a data transmission rate.

4. The method according to claim 1, further comprising automatically generating at least a second commutation format definition for a second operating state of said autonomous vehicle generating said data elements.

5. The method according to claim 4, further comprising receiving a plurality of triage values for at least one of the data elements, at least a first one of said plurality of triage values correlating to said current operating state and at least a second one of said plurality of triage values correlating to said second operating state.

6. The method according to claim 1, wherein said current operating state is determined by a particular activity in which said autonomous vehicle generating data elements is engaged when said commutated bitstream is being generated.

7. A method for optimizing bandwidth utilization in a communications network comprising:

defining a plurality of operating states of an autonomous vehicle, each associated with one of a plurality of activities performed by said autonomous vehicle in connection with a mission, said plurality of activities exclusive of data communication functions;

dynamically determining a current operating state of said autonomous vehicle based on a current activity of said autonomous vehicle;

generating data elements in a communication system onboard said autonomous vehicle, said data elements to be transmitted in a commutated bitstream; and responsive to a change in said current operating state, automatically selectively modifying a commutation format definition of said commutated bitstream;

wherein said automatically modified commutation format definition specifies a data stream sequence for transmitting all of said data elements in said commutated bitstream responsive to said identified change in said current operating state, said data stream sequence based on at least a relative priority level of said data elements during said current operating state.

8. A method for optimizing bandwidth utilization in a communications network comprising:

defining a plurality of operating states of an autonomous vehicle, each associated with one of a plurality of activities performed by said autonomous vehicle in connection with a mission, said plurality of activities exclusive of data communication functions;

dynamically determining a current operating state of said autonomous vehicle based on a current activity of said autonomous vehicle;

generating data elements in a communication system onboard said autonomous vehicle, said data elements to be transmitted in a commutated bitstream;

automatically generating a commutation format definition for said data elements which defines a commutation format for said commutated bitstream, the automatically generated commutation format definition automatically selectively determined based on said current operating state of said autonomous vehicle; and responsive to identifying a change of the operating state from said current operating state to a second operating state, formatting the commutated bitstream with the automatically generated commutation format definition;

wherein said automatically generated commutation format definition specifies a data stream sequence for transmitting all of said data elements in said commutated bitstream, said data stream sequence based on at least a relative priority level of said data elements for said second operating state.

9. The method according to claim 8, wherein said automatically generating said commutation format definition step further comprises receiving at least one triage value specifying said relative priority level for at least one of the data elements.

10. The method according to claim 9, further comprising defining the triage value to correlate to the second operating state.

11. The method according to claim 9, further comprising defining the triage value to correlate to a data transmission rate.

12. The method according to claim 8, wherein said at least one operating state is determined by a particular activity in which said autonomous vehicle generating data elements is engaged when said commutated bitstream is being generated.

13. A commutation format definition generator, comprising:

an operating state determining means for
accessing a storage device including information defining a plurality of operating states of an autonomous vehicle, each associated with one of a plurality of activities performed by said autonomous vehicle in connection with a mission, said plurality of activities exclusive of data communication functions, dynamically determining at least a current operating state of said autonomous vehicle based on a current activity of said autonomous vehicle configured for generating data elements to be transmitted in a commutated bitstream; and a generating means for automatically generating a commutation format definition for said data elements which defines a commutation format for said commutated bitstream, wherein said automatically generated commutation format definition is automatically selectively determined by said generating means based on said current operating state of said autonomous vehicle;

wherein said automatically generated commutation format definition specifies a data stream sequence for transmitting all of said data elements in said commutated bitstream, said data stream sequence based on at least a relative priority level of said data elements during said current operating state.

14. The commutation format definition generator according to claim 13, wherein said commutation format definition generator processes at least one triage value specifying said relative priority level of said data elements to generate said commutation format definition.

15. The commutation format definition generator according to claim 14, wherein the triage value correlates to a data transmission rate.

16. The commutation format definition generator according to claim 13, wherein the commutation format generator automatically selectively generates at least a second commutation format definition for a second operating state of said autonomous vehicle generating data elements transmitted in the commutated bitstream.

17. The commutation format definition generator according to claim 16, wherein the commutation format definition generator receives a plurality of triage values for at least one of the data elements, at least a first of said plurality of triage values correlating said current operating state and at least a second of said plurality of triage values correlating to said second operating state.

18. The commutation format definition generator according to claim 13, wherein said current operating state is determined by a particular activity in which said autonomous vehicle generating data elements is engaged when said commutated bitstream is being generated.

19. A system comprising:
a commutation format definition generator which
accesses a storage device including information defining a plurality of operating states of an autonomous vehicle, each associated with one of a plurality of activities performed by said autonomous vehicle in connection with a mission, said plurality of activities exclusive of data communication functions,
dynamically determines a current operating state of said autonomous vehicle based on a current activity of said autonomous vehicle configured for generating data elements to be transmitted in a commutated bitstream, and
automatically generates a commutation format definition for said data elements which defines a commutation format for said commutated bitstream, said automatically generated commutation format definition automatically selectively determined based on said current operating state of said autonomous vehicle; and
a commutation engine which automatically changes said commutation format of the commutated bitstream in response to identification of a change of said autonomous vehicle from said current operating state to a second operating state;
wherein said changed commutation format specifies a data stream sequence for transmitting all of said data elements in said commutated bitstream, said data stream sequence based on at least a relative priority levels of said data elements during said second operating state.

20. The system according to claim 19, wherein said commutation format definition generator receives at least one triage value specifying said relative priority level for at least one of the data elements.

21. The system according to claim 20, wherein the triage value correlates to the second operating state.

22. The system according to claim 20, wherein the triage value correlates to a data transmission rate.

23. The system according to claim 19, wherein said change from said current operating state to said second operating state is determined by detecting a change from a first activity to a second activity for said autonomous vehicle generating said data elements when said commutated bitstream is being generated.

* * * * *